US012622415B2

(12) United States Patent
Youn

(10) Patent No.: US 12,622,415 B2
(45) Date of Patent: May 12, 2026

(54) LITTER TRAY FOR TOILET TRAINING OF PETS

(71) Applicant: Soyul Youn, Daegu (KR)

(72) Inventor: Soyul Youn, Daegu (KR)

( * ) Notice: Subject to any disclaimer, the term of this patent is extended or adjusted under 35 U.S.C. 154(b) by 0 days.

(21) Appl. No.: 19/208,459

(22) Filed: May 14, 2025

(65) Prior Publication Data

US 2025/0351803 A1     Nov. 20, 2025

(30) Foreign Application Priority Data

May 17, 2024     (KR) ........................ 10-2024-0064685

(51) Int. Cl.
A01K 15/02     (2006.01)
A01K 1/01     (2006.01)
A01K 5/02     (2006.01)
A01K 7/02     (2006.01)

(52) U.S. Cl.
CPC .......... A01K 15/021 (2013.01); A01K 1/0107 (2013.01); A01K 5/02 (2013.01); A01K 7/02 (2013.01)

(58) Field of Classification Search
CPC ...... A01K 15/021; A01K 1/0107; A01K 5/02; A01K 7/02
USPC ........................................ 702/128, 129, 173
See application file for complete search history.

(56) References Cited

U.S. PATENT DOCUMENTS 9,883,656 B1 *  2/2018  Turner ................. A01K 27/002
2020/0281153 A1 *  9/2020  Hiroshima ........... A01K 29/005
2022/0361438 A1 *  11/2022  Kim ......................... A01K 1/01
2025/0160292 A1 *  5/2025  Leslie ..................... A01K 1/011

FOREIGN PATENT DOCUMENTS

KR     20210062995 A  *  6/2021  .......... A01K 15/025
KR     20240039264 A  *  3/2024  .......... A01K 15/021

OTHER PUBLICATIONS

Machine Translation of KR-20240039264-A, Kim Cho Hee, Mar. 26, 2024 (Year: 2024).*
Machine Translation of KR-20210062995-A, Rhyoo Moon Sung, Jun. 1, 2021 (Year: 2021).*

* cited by examiner

*Primary Examiner* — Kimberly S Berona
*Assistant Examiner* — Katherine June Walter
(74) *Attorney, Agent, or Firm* — Lowry Blixseth APC; Scott M. Lowry

(57)     ABSTRACT

The litter tray for toilet training of pets includes a horizontal plate resting on the ground and comprising a mesh litter box spaced apart from the top surface; a vertical plate integrally formed with the horizontal plate and extending vertically from one end of the horizontal plate; a dispenser disposed on an upper portion of the vertical plate for supplying food and water; a dispensing tray disposed below the dispenser to receive the supplied food and water; and a control module comprising a processor, the control module identifying pressure points through at least one pressure sensor installed inside the horizontal plate, wherein if three pressure points are detected, urination is determined to have occurred, and if four pressure points are detected, defecation is determined to have occurred, and based on the determination, the processor controls a speaker mounted on one side of the vertical plate to output a preset sound.

10 Claims, 6 Drawing Sheets

LITTER TRAY FOR TOILET TRAINING OF PETS

BACKGROUND OF THE INVENTION

The present invention relates to a litter tray for toilet training of pets, and more particularly, to a litter tray that induces a pet to defecate on the tray using a preset sound source, detects defecation on the tray, and outputs a preset sound (such as encouragement or praise) based on whether defecation has occurred, thereby enabling the pet to be encouraged or praised even in the absence of the pet owner.

In general, a pet refers to an animal that lives together with humans, not merely as a toy but as a companion whose presence and benefits to humans are respected. The term encompasses a variety of animals—such as dogs, cats, and more—depending on the owner's preferences.

As most pets live indoors, they require various forms of training, including toilet training. Accordingly, a wide range of efforts have been made to improve the effectiveness of such training and to develop the intelligence of pets.

Typically, toilet training for pets involves laying several layers of newspaper on the floor. When the pet shows signs of defecation or urination, the owner places the pet on the newspaper and waits until it finishes. Through repetition, the pet learns to use the newspaper as a toilet area. Alternatively, a toilet tray or pad may be used in place of newspaper.

Layering the newspapers serves to retain the pet's urine odor on the bottom layers, which helps attract the pet back to the same spot in the future by recognizing its own scent. However, this method requires considerable time and effort from the pet owner, making consistent training difficult.

As a solution to such problems, Korean Patent Publication No. 10-2021-0045261 discloses a pet toilet training device. In this prior art, when a dog defecates on a pad, a temperature sensor detects the event, and a treat stored inside the main body is dispensed through an outlet.

However, this conventional technology has a drawback in that it cannot provide differentiated feedback based on the pet's specific type of excretion.

Therefore, there is a need for a toilet training tray for pets that outputs a familiar voice of the owner instead of treats, allowing pets to be toilet-trained through encouragement and praise even in the absence of the owner.

SUMMARY OF THE INVENTION

The present invention is intended to solve the aforementioned problems, and its object is to provide a toilet training tray for pets that induces a pet to defecate on the tray using a preset sound source, detects defecation on the tray, and, depending on whether defecation has occurred, outputs a preset sound (such as encouragement or praise), thereby enabling the pet to be encouraged or praised even in the absence of the pet owner.

The problems to be solved by the present invention are not limited to those mentioned above, and other problems not specifically stated will be clearly understood by those skilled in the art from the following detailed description.

To address the aforementioned problems, the toilet training tray for pets according to the present invention comprises: a horizontal plate placed on the floor and provided with a mesh-type toilet surface spaced apart from its upper surface; a vertical plate integrally formed with the horizontal plate and extending vertically from one end of the horizontal plate; a dispenser disposed at an upper portion of the vertical plate, configured to supply food and water for a pet; a dispensing tray disposed below the dispenser to receive the supplied food and water; and a control module comprising a processor, configured to identify pressure points through at least one pressure sensor installed inside the horizontal plate, determine urination when three pressure points are detected, and determine defecation when four pressure points are detected, and output a preset sound through a speaker mounted on one side of the vertical plate based on the determination.

The toilet training tray may further comprise a hemispherical roll case located at the intersection of the horizontal and vertical plates, which houses a roll-type toilet sheet wound in a roll form.

The roll-type toilet sheet may be cut by external force to a size similar to the area of the toilet surface and placed thereon.

The roll case may include: a magnetic openable cover; a first support wall into which a central hole of the roll-type toilet sheet is inserted and fitted, the first support wall being provided with a central shaft to mount the sheet; a second support wall facing the first support wall and integrally formed with the openable cover, the second support wall opening and closing simultaneously with the cover; and a third support wall contacting the cover, wherein the third support wall may include a cutting section arranged along its upper surface to sever the toilet sheet.

The roll case may further comprise: a cover portion attached to the exterior of the roll case to allow easy cleaning of waste adhered during pet excretion; and a gripping portion disposed on the top surface of the roll case, protruding upward by a predetermined length to allow a user to grasp it.

The cover portion may be made of a silicone material, and may include a magnetic body attached to its inner surface for magnetic coupling with the openable cover.

The dispenser may comprise: a plurality of supply nozzles respectively supplying food and water to the dispensing tray; and a first partition wall disposed inside the dispenser to separate the stored food and water.

The dispensing tray may comprise a second partition wall disposed therein to separate food and water supplied through the plurality of supply nozzles.

The horizontal plate may comprise a slide plate that collects pet waste dropped onto the surface and is slidable in a forward direction for removal and cleaning.

The slide plate may be integrally formed and include corner portions disposed at its edges.

Each corner portion may include: a recessed hole centrally formed to accommodate a deodorizing agent for neutralizing the odor of pet waste; and an inlet film cross-cut to surround the recessed hole to prevent the deodorizing agent from overflowing due to external shocks or vibrations.

The vertical plate may comprise: the speaker; a display disposed on the front surface of the vertical plate; a camera disposed on the upper surface of the display; and a thermal sensor. The control module may further comprise a memory and a communication module.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
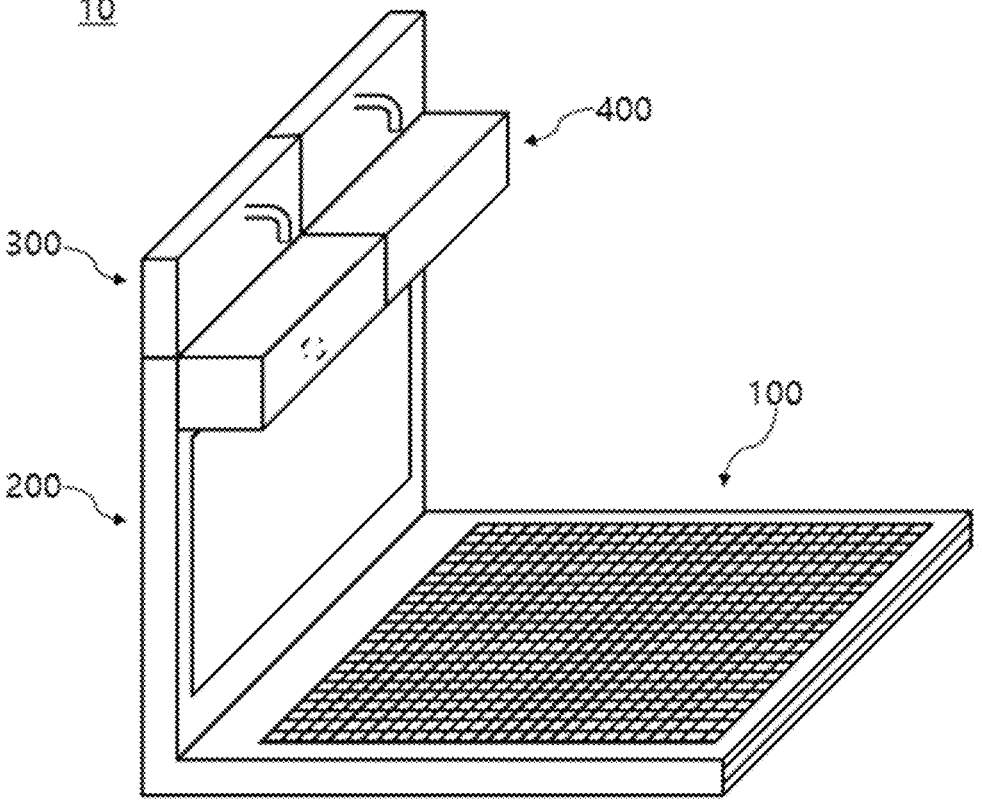
FIG. 1 is a diagram showing a toilet training tray for pets according to an embodiment of the present invention.

Although several embodiments have been described in detail for purposes of illustration, various modifications may be made without departing from the scope and spirit of the invention. Accordingly, the invention is not to be limited, except as by the appended claims.

The present invention is capable of various modifications and having a variety of embodiments, and specific embodiments are illustrated in the drawings and described in detail below. However, it should be understood that this is not intended to limit the invention to the particular forms disclosed, but rather, all modifications, equivalents, and alternatives falling within the spirit and scope of the invention are intended to be included.

In the drawings, similar reference numerals have been used to denote similar components throughout the different figures.

When a component is described as being "connected" or "coupled" to another component, it should be understood that the component may be directly connected or coupled to the other component, or indirectly connected or coupled via one or more intermediate components. In contrast, when a component is described as being "directly connected" or "directly coupled" to another component, it should be understood that no intermediate components are present.

The terminology used herein is for the purpose of describing particular embodiments only and is not intended to be limiting of the invention. As used herein, the singular forms "a," "an," and "the" are intended to include the plural forms as well, unless the context clearly indicates otherwise.

Furthermore, terms such as "comprise" or "have," as used in the present specification, are intended to specify the presence of stated features, integers, steps, operations, elements, components, or combinations thereof, but do not preclude the presence or addition of one or more other features, integers, steps, operations, elements, components, or combinations thereof.

Hereinafter, embodiments of the present invention will be described in detail with reference to the accompanying drawings. Like reference numerals refer to like elements throughout the drawings. In the following description, well-known functions or constructions are not described in detail since they would obscure the understanding of the invention.

Figure 2:
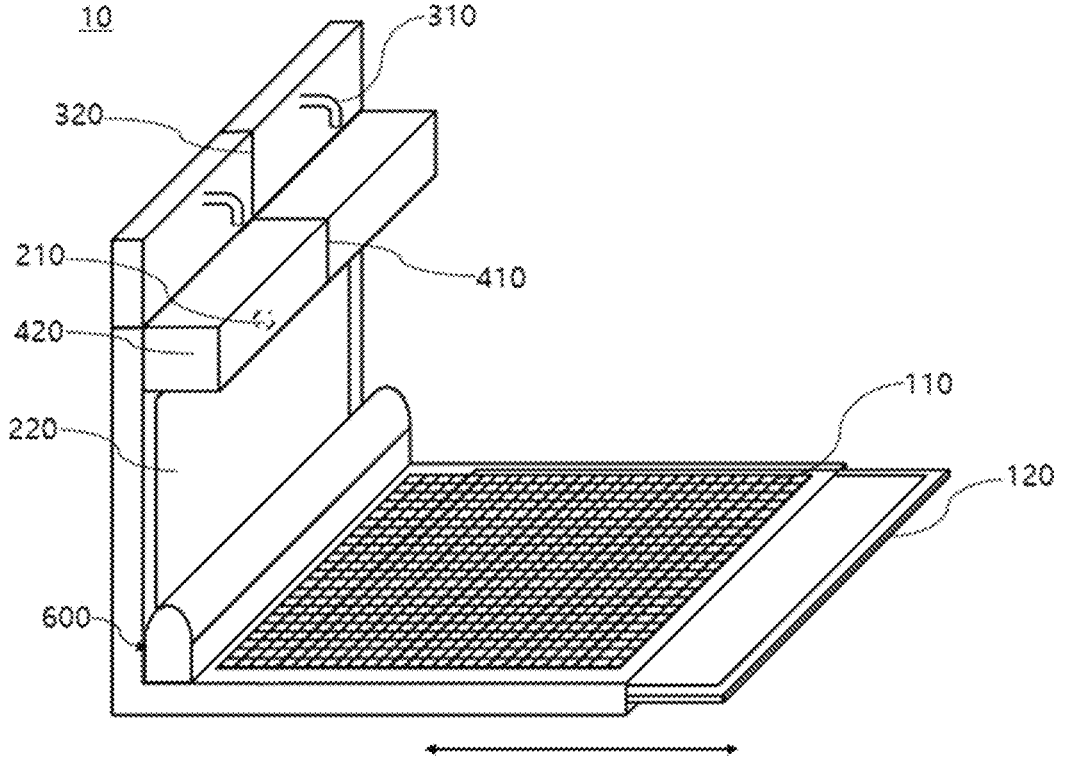
FIG. 2 is a diagram showing a roll case and a slide plate of the toilet training tray for pets according to an embodiment of the present invention.
Figure 3:
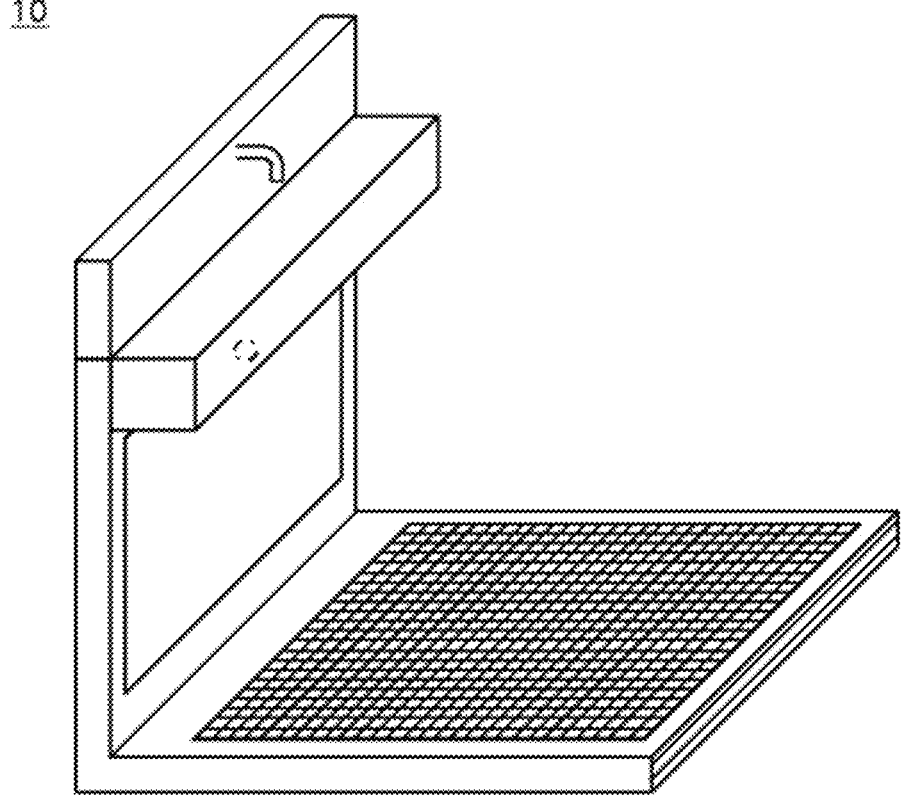
FIG. 3 is a diagram showing another example of the toilet training tray for pets according to an embodiment of the present invention.
Figure 4:
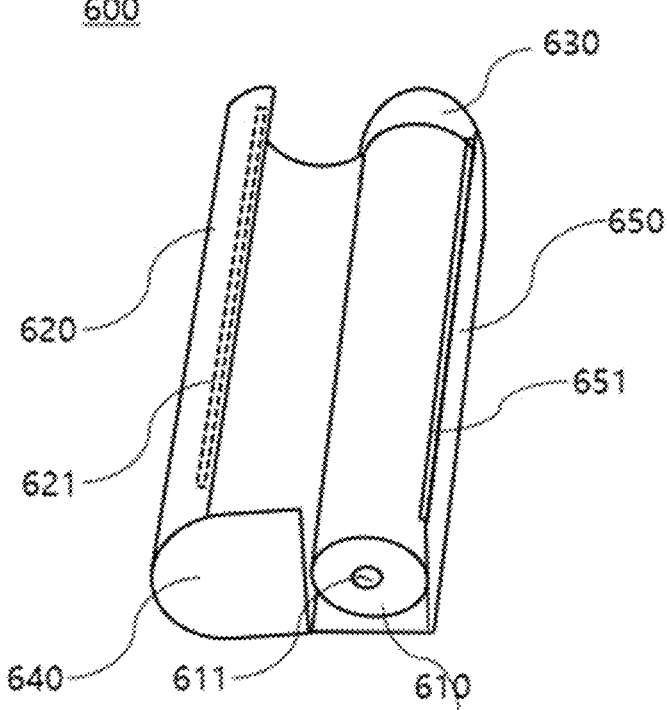
FIG. 4 is a diagram showing the state in which the roll case is mounted in the toilet training tray for pets according to an embodiment of the present invention.
Figure 5:
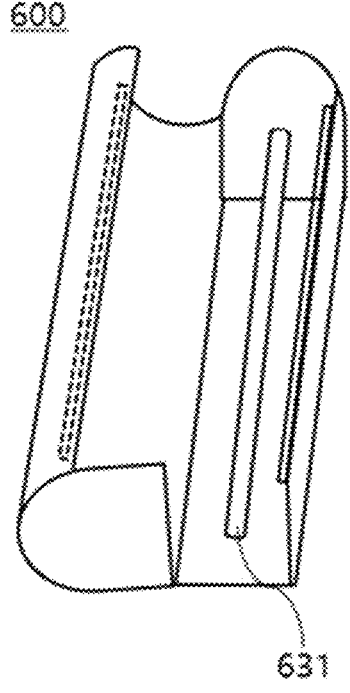
FIG. 5 is a diagram showing an open state of the roll case and its central shaft in the toilet training tray for pets according to an embodiment of the present invention.
Figure 6:
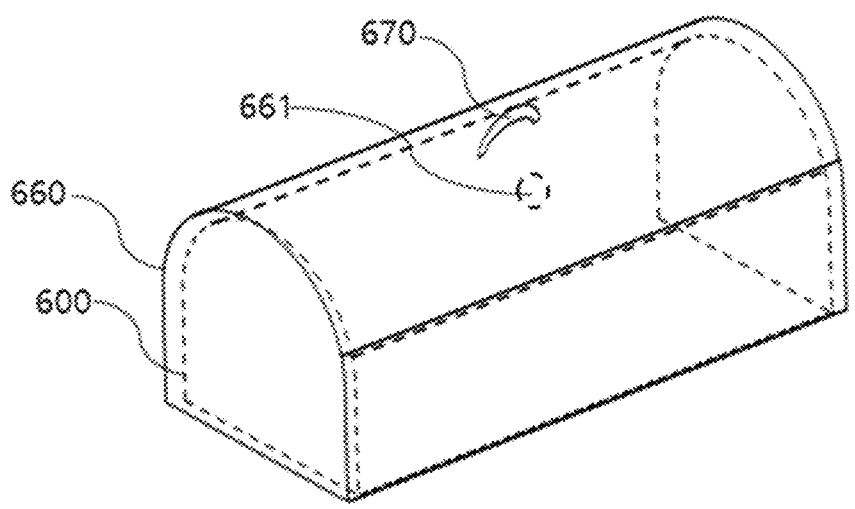
FIG. 6 is a diagram showing a cover portion of the roll case in the toilet training tray for pets according to an embodiment of the present invention.
Figure 7:
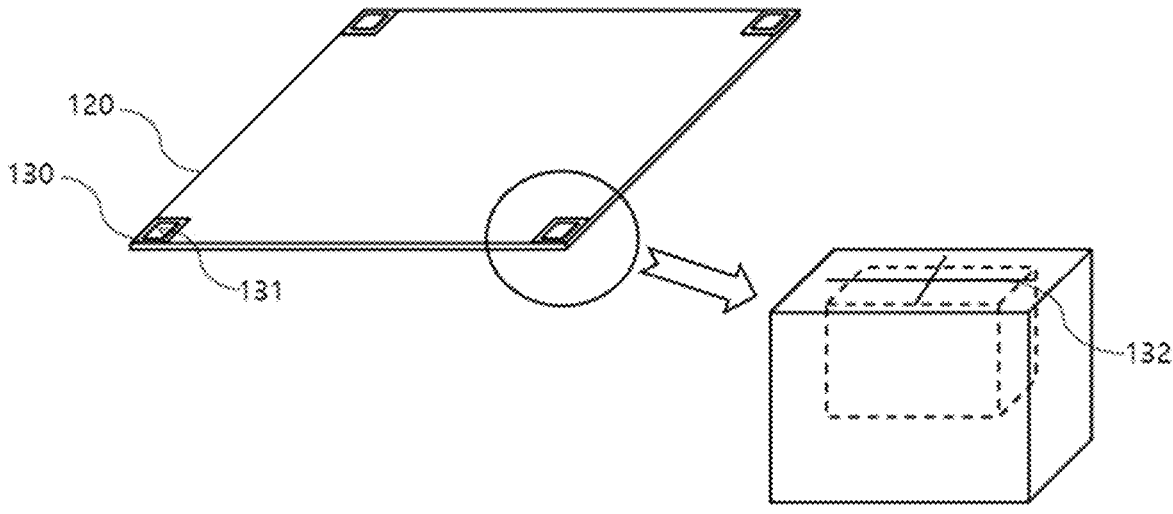
FIG. 7 is a diagram showing a corner portion of the toilet training tray for pets according to an embodiment of the present invention.
Figure 8:
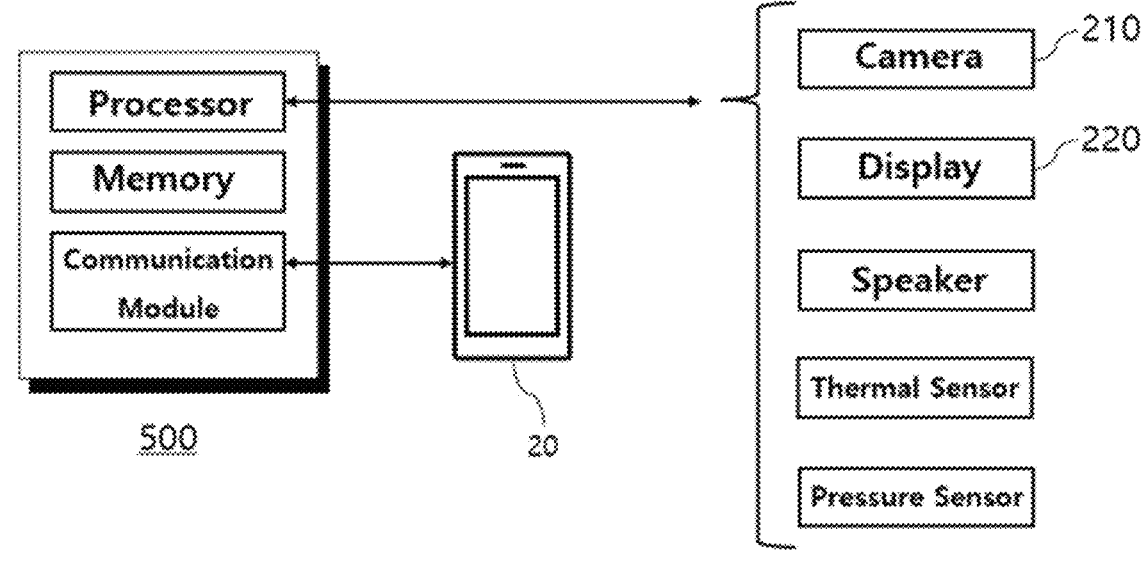
FIG. 8 is a diagram showing a control system of the toilet training tray for pets according to an embodiment of the present invention.

FIG. 1 is a view illustrating a toilet training tray for pets according to an embodiment of the present invention. FIG. 2 is a view illustrating a roll case and a slide plate of the toilet training tray for pets according to an embodiment of the present invention. FIG. 3 is a view illustrating another example of the toilet training tray for pets according to an embodiment of the present invention. FIG. 4 is a view illustrating a state in which the roll case is mounted in the toilet training tray for pets according to an embodiment of the present invention. FIG. 5 is a view illustrating an open state of the roll case and a central shaft in the toilet training tray for pets according to an embodiment of the present invention. FIG. 6 is a view illustrating a cover portion of the roll case in the toilet training tray for pets according to an embodiment of the present invention. FIG. 7 is a view illustrating a corner portion of the toilet training tray for pets according to an embodiment of the present invention. FIG. 8 is a view illustrating a control system of the toilet training tray for pets according to an embodiment of the present invention.

Referring to FIGS. 1 through 8, the toilet training tray for pets (10) according to the present invention comprises a horizontal plate (100), a vertical plate (200), a dispenser (300), a dispensing tray (400), a control module (500), and a roll case (600).

The horizontal plate (100) is placed on the floor and includes a mesh-type toilet surface (110) that is spaced apart from its upper surface. Here, the upper surface refers to the upper surface of a slide plate (120), which will be described later.

The horizontal plate (100) may include a slide plate (120) that collects pet waste falling onto it and is slidable in a forward direction for the removal and cleaning of the collected waste.

As shown in FIG. 7, the slide plate (120) may be integrally formed and include corner portions (130) disposed at each corner. Each of these corner portions (130) may include a recessed hole (131) formed at its center to accommodate a deodorizing agent for neutralizing the odor of the pet waste.

The slide plate (120) may further be provided with a handle (not shown) that allows a user to pull it out from the horizontal plate (100). However, this is merely an example, and a groove may be formed instead of a handle.

In addition, each corner portion (130) may include a cross-slit inlet film (132) surrounding the recessed hole (131), to prevent the deodorizing agent accommodated therein from overflowing due to external impact or vibration. The inlet film (132) may be made of rubber.

Meanwhile, although not illustrated, the bottom surface of the horizontal plate (100), which contacts the ground, may be provided with multiple anti-slip silicone pads to prevent slipping or displacement from a fixed position.

The horizontal plate (100) may also be equipped with a plurality of wheels for ease of movement. These wheels may be inserted into grooves formed on the bottom surface of the horizontal plate (100). That is, the wheels may remain inserted in the grooves when not in use and protrude out from the grooves when in use.

The vertical plate (200) is integrally formed with the horizontal plate (100) and extends vertically from one end of the horizontal plate (100).

The vertical plate (200) may include a speaker, a display (220) disposed on the front surface of the vertical plate (200), a camera (210) disposed on the upper surface of the display (220), and a thermal sensor.

Referring to FIGS. 1 to 3, the dispenser (300) is disposed at the upper portion of the vertical plate (200) and is configured to supply food and water to the pet.

The dispenser (300) may include a plurality of supply nozzles (310) and a first partition wall (320). The plurality of supply nozzles (310) may be configured to respectively supply food and water to the dispensing tray (400).

The first partition wall (320) may be disposed inside the dispenser (300) to separate the food and water stored therein.

The first partition wall (320) may be detachable from the dispenser (300), allowing the storage space of the dispenser (300) to be selectively used as either a single compartment or two separate compartments depending on the intended use.

Likewise, the number of supply nozzles may be one or two, depending on the usage requirements.

The dispensing tray (400) is disposed below the dispenser (300) and receives the supplied food and water.

The dispensing tray (400) may include a second partition wall (410) disposed therein to separate the food and water supplied through the plurality of supply nozzles (310).

The second partition wall (410) may also be detachable from the dispensing tray (400), allowing the storage space of the dispensing tray (400) to be selectively used as either a single compartment or two separate compartments depending on the intended use.

Referring to FIG. 8, the control module (500) includes a processor configured to identify pressure points through at least one pressure sensor (540) mounted inside the horizontal plate (100), determine urination when three pressure points are detected, and determine defecation when four pressure points are detected. Based on this determination, the processor controls a speaker mounted on one side of the vertical plate (200) to output a preset sound source.

The control module (500) may further include a memory and a communication module.

The control module (500) may be implemented as an electronic device that identifies the location of pressure through at least one pressure sensor (540) mounted inside the horizontal plate (100), determines urination when three pressure points are detected, and determines defecation when four pressure points are detected, and outputs a preset sound through a speaker mounted on one side of the vertical plate (200) accordingly.

In addition, the control module (500) may communicate with a thermal sensor and a camera, and detect the movement of the pet based on at least one of a signal obtained from the thermal sensor and an image obtained from the camera (210).

Accordingly, when the movement of the pet is detected, the control module (500) may transmit images obtained from the camera (210) to a user terminal (20) during the time that the movement is being detected.

The user terminal (20) may include various electronic devices such as a mobile device, laptop, or desktop.

Furthermore, when a video is received from the user terminal (20), the control module (500) may output the received video via the display (220), and output an audio signal associated with the video through the speaker.

The control module (500) may also determine whether a pet has defecated based on data obtained from the thermal sensor.

Specifically, the control module (500) may determine urination when three pressure points are detected based on signals from the pressure sensor, and determine defecation when four pressure points are detected. Then, after the number of pressure points changes to two or fewer, if a heat-emitting object other than the pet is identified based on the signal obtained from the thermal sensor, the control module may determine that actual excretion has occurred, thereby performing verification of the pet's defecation activity.

The processor may include one or more cores and may comprise processors for data analysis and deep learning, such as a Central Processing Unit (CPU), a General Purpose Graphics Processing Unit (GPGPU), or a Tensor Processing Unit (TPU). The processor may read computer programs stored in memory and perform data processing for machine learning according to an embodiment of the present disclosure. Additionally, the processor may control the operation of the components of the electronic device and implement the overall system operation.

For example, the processor may typically control the overall operation of the electronic device. By processing signals, data, and information input or output through the components described above, or by executing application programs stored in memory, the processor may provide or process appropriate information or functions to the user.

The processor may also control at least some of the components of the electronic device in order to execute application programs stored in the memory. Furthermore, to operate such application programs, the processor may coordinate and operate at least two or more components included in the electronic device.

According to one embodiment of the present disclosure, the memory may store information of any type generated or determined by the processor, as well as information of any type received by the network unit. The memory may include at least one type of storage medium, such as a flash memory type, hard disk type, multimedia card micro type, card-type memory (e.g., SD or XD memory), Random Access Memory (RAM), Static RAM (SRAM), Read Only Memory (ROM), Electrically Erasable Programmable ROM (EE-PROM), Programmable ROM (PROM), magnetic memory, magnetic disk, or optical disk. The electronic device may also operate in connection with web storage that performs storage functions over the Internet.

The above description of the memory is provided merely as an example and is not intended to limit the scope of the present disclosure.

The communication module, which transmits wired or wireless signals to other devices, may perform communication with external devices. In particular, the communication module may include or be configured as a communication circuit that performs the function of various communication chips such as a Wi-Fi chip, Bluetooth chip, wireless communication chip, NFC chip, or Bluetooth Low Energy (BLE) chip.

The user terminal (20) may include a processor, memory, communication module, and display. Since the processor, memory, and communication module are described in detail in FIG. 2, further description thereof will be omitted. The display of the user terminal may include various types of displays, including a touch screen display.

Referring to FIGS. 4 and 5, the toilet training tray for pets (10) may further include a roll case (600).

The roll case (600) may be located at the intersection of the horizontal plate (100) and the vertical plate (200), and may have a hemispherical shape in which a roll-type toilet sheet (610) wound in a roll form is mounted.

The roll-type toilet sheet (610) may be cut by external force into a size similar to that of the toilet surface (110) and placed on the upper surface of the toilet surface (110) or the slide plate (120).

The roll case (600) may include a cover section (620), a first support wall (630), a second support wall (640), and a third support wall (650).

The cover section (620) may have magnetic properties. Although not shown in the drawings, the cover section (620) may further include a plurality of anti-slip protrusions to prevent the user's hand from slipping during opening and closing.

Referring to FIG. 6, the roll case (600) may further include a cover portion (660) and a gripping portion (670). The cover portion (660) may be attachable to the roll case (600) in a manner that allows easy cleaning of waste adhered to the exterior due to pet excretion.

The cover portion (660) may be made of a silicone material.

Additionally, the cover portion (660) may include a magnetic body (661) attached to its inner surface, which enables magnetic coupling with the cover section (620).

Furthermore, the cover portion (660) may have an open bottom surface so that it can cover the roll case (600) from top to bottom.

To fix the state in which the cover portion (660) is fitted onto the roll case (600), the cover section (620) and the magnetic body (661) attached to the inner surface of the cover portion (660) may be magnetically coupled.

The inner surface of the cover portion (660) may be located to face and contact the cover section (620). Therefore, the cover portion (660) may be magnetically coupled to the cover section (620).

The gripping portion (670) may be disposed on the upper surface of the cover portion (660) and protrude upward by a predetermined length so that a user can grip it. The gripping portion (670) may take the form of a handle.

Meanwhile, although not illustrated, the gripping portion (670) may also be recessed rather than protruding.

The first support wall (630) may be provided with a central shaft (631) inserted into a central hole (611) of the roll-type toilet sheet (610), allowing the sheet (610) to be mounted.

The first support wall (630) may be integrally formed with and fixed to the bottom surface of the roll case (600).

The second support wall (640) may face the first support wall (630) and may be integrally formed with the cover section (620) so that it opens and closes simultaneously with the operation of the cover section (620).

The third support wall (650) may be in surface contact with the cover section (620), that is, it may contact the cover section (620) when the cover section is in a closed state. The third support wall (650) may include a cutting portion (651) arranged along its upper surface to cut the roll-type toilet sheet (610).

In this case, the cover section (620) may include a protective pad (621) attached to the inner surface of the cover section at a position corresponding to the cutting portion (651), such that the protective pad contacts the outer surface of the cutting portion (651), i.e., the surface facing the horizontal plate (100).

The protective pad (621) may prevent the user's hand from coming into contact with the cutting portion (651) when opening or closing the cover section (620), thereby protecting the user's hand from the cutting edge. The protective pad (621) may be made of silicone material.

The best modes for carrying out the invention have been disclosed in the drawings and the specification. While specific terminology has been used, it is for the purpose of illustration and description only, and not intended to limit the scope of the invention as defined by the claims.

Therefore, it will be understood by those skilled in the art that various modifications, equivalents, and alternative embodiments may be made without departing from the scope and spirit of the invention. Accordingly, the true scope of technical protection of the invention should be defined by the technical spirit described in the appended claims.

What is claimed is:

1. A toilet training tray for pets, comprising:
   a horizontal plate that rests on the ground and comprises a mesh litter box spaced apart from a top surface;
   a vertical plate integrally formed with the horizontal plate and extending vertically from one end of the horizontal plate;
   a dispenser disposed on an upper portion of the vertical plate, the dispenser configured to supply food and water for the pets;
   a dispensing tray disposed below the dispenser to receive the supplied food and water; and
   a control module comprising a processor, the control module configured to identify pressure points through at least one pressure sensor installed inside the horizontal plate, wherein if three pressure points are detected, urination is determined to have occurred, and if four pressure points are detected, defecation is determined to have occurred, and based on the determination, the processor controls a speaker mounted on one side of the vertical plate to output a preset sound source.

2. The toilet training tray for pets according to claim 1, further comprising a hemispherical roll case positioned at an intersection of the horizontal plate and the vertical plate, the roll case housing a defecation sheet wound in a roll form; wherein the defecation sheet is configured to be severed by an external force in a shape similar to the area of the pad and is placed on the pad.

3. The toilet training tray for pets according to claim 2, wherein the roll case further comprises:
   a magnetic opening/closing portion;
   a first support wall into which a central hole of the defecation sheet is inserted and fitted, the first support wall being configured to mount the defecation sheet;
   a second support wall facing the first support wall and integrally formed with the magnetic opening/closing portion, the second support wall being opened or closed together with the opening/closing portion; and
   a third support wall contacting the opening/closing portion, wherein the third support wall includes a cutting portion arranged along an upper surface of the third support wall to sever the defecation sheet.

4. The toilet training tray for pets according to claim 3, wherein the roll case further comprises:
   a cover mounted to the roll case and allowing easy cleaning of fecal matter adhered by pet defecation activities; and
   a grip portion disposed on an upper surface of the roll case, the grip portion protruding upward by a predetermined length for user handling.

5. The toilet training tray for pets according to claim 4, wherein the cover is made of a silicone material, and the cover includes a magnetic material attached to an inner surface thereof to be magnetically coupled to the opening/closing portion.

6. The toilet training tray for pets according to claim 1, wherein the dispenser comprises:
   a plurality of supply nozzles respectively configured to supply food and water to the dispensing tray; and
   a first partition wall disposed inside the dispenser to separate the stored food and water.

7. The toilet training tray for pets according to claim 6, wherein the dispensing tray comprises a second partition wall disposed inside the dispensing tray to separate the food and water supplied through the plurality of supply nozzles.

8. The toilet training tray for pets according to claim 1, wherein the horizontal plate comprises: a slide plate for collecting pet waste dropped onto the pad, the slide plate being slidable in a frontward direction for removal and cleaning of collected waste, wherein the slide plate is integrally formed and includes corner portions disposed at each corner, each of the corner portions comprising: a recessed hole centrally formed to accommodate a deodorizer for removing odors of the waste; and an inlet film cross-cut to surround the recessed hole to prevent the deodorizer accommodated in the recessed hole from overflowing due to external impact or vibration.

9. The toilet training tray for pets according to claim 1, wherein the vertical plate comprises:

the speaker, a display disposed on a front surface of the vertical plate;

a camera disposed on an upper surface of the display; and a thermal sensor.

10. The toilet training tray for pets according to claim 1, wherein the control module comprises:

a memory; and a communication module.

\* \* \* \* \*